United States Patent
Nobis et al.

(10) Patent No.: US 9,846,031 B2
(45) Date of Patent: Dec. 19, 2017

(54) METHOD AND SYSTEM FOR TESTING A VEHICLE UNDERBODY OF A MOTOR VEHICLE

(71) Applicant: ROBERT BOSCH GMBH, Stuttgart (DE)

(72) Inventors: Guenter Nobis, Nuertingen (DE); Volker Uffenkamp, Ludwigsburg (DE); Masato Takami, Heidelberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 173 days.

(21) Appl. No.: 14/412,289

(22) PCT Filed: Jun. 11, 2013

(86) PCT No.: PCT/EP2013/062021
§ 371 (c)(1),
(2) Date: Dec. 31, 2014

(87) PCT Pub. No.: WO2014/005804
PCT Pub. Date: Jan. 9, 2014

(65) Prior Publication Data
US 2015/0260511 A1    Sep. 17, 2015

(30) Foreign Application Priority Data
Jul. 6, 2012    (DE) .......................... 10 2012 211 791

(51) Int. Cl.
*H04N 7/18* (2006.01)
*G01B 11/275* (2006.01)
(Continued)

(52) U.S. Cl.
CPC ........ *G01B 11/2755* (2013.01); *G06T 1/0007* (2013.01); *G06T 7/593* (2017.01);
(Continued)

(58) Field of Classification Search
CPC .......... G01B 11/2755; G01B 2210/146; G06T 1/0007; G06T 7/0075; G06T 2207/10012; G06T 2207/30268; H04N 7/183
(Continued)

(56) References Cited

U.S. PATENT DOCUMENTS

| | | | |
|---|---|---|---|
| 6,504,569 B1 * | 1/2003 | Jasinschi ................ | G06T 7/246 345/950 |
| 2002/0009732 A1 | 1/2002 | Sutton et al. | |

(Continued)

FOREIGN PATENT DOCUMENTS

| | | |
|---|---|---|
| CN | 102245433 A | 11/2011 |
| DE | 29 515 738 | 11/1995 |

(Continued)

OTHER PUBLICATIONS

International Search Report for PCT/EP2013/062021, dated Sep. 26, 2013.

*Primary Examiner* — Tracy Y Li
(74) *Attorney, Agent, or Firm* — Norton Rose Fulbright US LLP; Gerard Messina

(57) ABSTRACT

A method for testing a vehicle underbody of a motor vehicle includes: recording at least one image of at least one region of the vehicle underbody of the motor vehicle using a camera device; producing a three-dimensional depth image with the aid of the at least one recorded image of the at least one region of the vehicle underbody of the motor vehicle; and testing the at least one region of the vehicle underbody of the motor vehicle with the aid of the produced three-dimensional depth image of the vehicle underbody using optical image recognition.

19 Claims, 14 Drawing Sheets

(51) Int. Cl.
*G06T 1/00* (2006.01)
*G06T 7/593* (2017.01)

(52) U.S. Cl.
CPC ....... *H04N 7/183* (2013.01); *G01B 2210/146* (2013.01); *G06T 2207/10012* (2013.01); *G06T 2207/30268* (2013.01)

(58) Field of Classification Search
USPC .......................................... 348/148
See application file for complete search history.

(56) References Cited

U.S. PATENT DOCUMENTS

| | | | |
|---|---|---|---|
| 2003/0185340 A1* | 10/2003 | Frantz | G01N 21/8806 378/57 |
| 2007/0027376 A1 | 2/2007 | Todokoro et al. | |
| 2007/0040911 A1 | 2/2007 | Riley | |
| 2008/0211914 A1 | 9/2008 | Herrera et al. | |
| 2009/0290757 A1 | 11/2009 | Mian et al. | |
| 2011/0255741 A1* | 10/2011 | Jung | G06K 9/00369 382/103 |
| 2011/0299597 A1* | 12/2011 | Freiburg | H04N 19/132 375/240.16 |
| 2012/0257047 A1* | 10/2012 | Biesemans | G06K 9/0063 348/135 |

FOREIGN PATENT DOCUMENTS

| | | |
|---|---|---|
| DE | 197 05 047 | 8/1998 |
| DE | 10 2006 024 979 | 2/2007 |
| DE | 10 2006 035232 | 1/2008 |
| EP | 1 619 625 | 1/2006 |
| WO | WO 2004/110054 | 12/2004 |
| WO | WO 2010/028965 | 3/2010 |

\* cited by examiner

METHOD AND SYSTEM FOR TESTING A VEHICLE UNDERBODY OF A MOTOR VEHICLE

BACKGROUND OF THE INVENTION

1. Field of the Invention

The present invention relates to a method and a system for testing a vehicle underbody of a motor vehicle.

2. Description of the Related Art

A series of methods and devices are known for taking a picture of a vehicle underbody. In this context, a two-dimensional picture is taken as output. Other systems also exist, however, which supply three-dimensional information. In some methods, the three-dimensional sets of information are gathered from takes from different viewing angles. Other methods produce three-dimensional sets of information from a projection of laser lines on the vehicle underbody.

For this purpose, a mobile device is frequently used having wheels and a rod on which there is a mirror. This form of manual-optical inspection has the advantage that it may be used in mobile fashion. However, the middle section of the vehicle underbody is mostly not reached, using this item.

US Patent application publication 2002 009 732 1 A1 describes a device having a rod that has a digital camera on it.

Published international patent application document WO 2004 11 00 54 A1 describes a remote controlled platform which is equipped with one or more cameras.

US Patent application publication 2008 211 914 A1 describes a method for the automatic production of an underbody picture using a line scan camera. In the method described there, the travel direction and the speed of the vehicle are also recorded by additional sensors, in order to produce an overall picture having sufficient quality.

US Patent application publication 2007 027 376 0 A1 describes how an overall picture may be produced from the images of a plurality of area scan cameras. The position and the direction of view of the cameras relative to one another have to be known ahead of time. This relative orientation is ascertained by calculation, using the angular aperture of the cameras, the direction of view of the cameras with respect to the vertical and the expected distance between the cameras and the underbody. The individual images are rectified and combined to form a single underbody picture.

In Published European patent application document EP 1 619 625 A2 it is described that a plurality of cameras are used in a predefined linear or two-dimensional or three-dimensional arrangement, so that the field of view of each camera overlaps at least partially with the field of view of at least one other camera. The generated image data from this system may also be processed further so as to generate a three-dimensional picture.

One further method for determining vehicle views including the generation of three-dimensional profile data is described in US Patent application publication 2009 290 757 A1. In the method described there, the measurement takes place according to the principle of laser triangulation. For this purpose, one or more cameras are configured with one or more laser lines in such a way that the laser lines have a specified angle with respect to the camera, and the laser lines imaged on the object lie within the field of view of the cameras. Furthermore, the stereo triangulation, while using two or more cameras, is also named as an alternative configuration for generating three-dimensional profile data.

US Patent application publication 2009 290 757 A1 describes a test stand, at which vehicles are taken from different perspectives. In this context, laser lines are projected onto the surface to enable a three-dimensional reconstruction. The entire vehicle or only a part of the vehicle is optionally reconstructed, in order to compare it to a model or a data set of takes, and thus to detect irregularities on the vehicle.

Published German patent application document DE 197 05 047 A1 relates to a method and a device for measuring a profile depth of a motor vehicle tire. In this context, the profile of the motor vehicle tire is acted upon by laser light from a laser. The laser light generates a patch of light onto the profile surface of the motor vehicle tire. The light reflected by the tire profile is recorded by an image resolving sensor. In the process, the image resolving sensor observes the position and/or the form of the patch of light. The signals of the image resolving sensor are processed to produce output data according to the profile depth. During the measurement, the motor vehicle tire is rotated, so that the measurement may be performed at a plurality of locations on the tire profile.

Devices and methods are available for special applications, such as at control stations on border crossings, approaches to, or roads already at a market, for video-based takes of a vehicle underbody. Systems both exist which take the entire underbody using a single take, and those which produce one underbody picture from a plurality of temporally or spatially offset takes.

BRIEF SUMMARY OF THE INVENTION

A method is specified for testing a vehicle underbody of a motor vehicle having the following method steps: Recording at least one image of at least one region of the vehicle underbody of the motor vehicle using a camera device; producing a three-dimensional depth image with the aid of the at least one recorded image of the at least one region of the vehicle underbody of the motor vehicle; and testing the at least one region of the vehicle underbody of the motor vehicle with the aid of the three-dimensional depth image of the vehicle underbody using optical image recognition.

A system for testing a vehicle underbody of the motor vehicle has a camera device, which is designed to record at least one image of at least one region of the vehicle underbody of the motor vehicle, and an evaluation device which is designed to produce a three-dimensional depth image with the aid of the at least one recorded image of the at least one region of the vehicle underbody of the motor vehicle and to test the at least one region of the vehicle underbody of the motor vehicle with the aid of the produced three-dimensional depth image of the vehicle underbody using optical image recognition.

The present invention ensures a cost-effective and robust design approach by the use of a camera device. Moreover, the present invention does not require any long-term stability of calibration with other sensors or the use of laser line transmitters. In the case of the present invention, simple installation of the system may take place in the roadway or in a planar crossing threshold.

Furthermore, the present invention enables detecting invalid measurements in response to exceeding a specified crossing speed and an approximate ascertainment of the traveling speed.

Yet another advantage of the present invention is that, because of the high resolution of the two-dimensional image, a high resolution is achieved of the three-dimensional model using the depth information of the underbody for testing the underbody.

The idea of the present invention provides undertaking the testing of a vehicle underbody and a two-dimensional representation of the vehicle underbody with the simultaneous production of a three-dimensional depth image using only camera device.

According to one advantageous refinement of the present invention, it is provided that the method be carried out during the motor vehicle's rolling all the way over the camera device. When this is done, the option advantageously comes about of recording and storing image data for improved testing, as well as the possibility of comparing the current state of the vehicle underbody to stored reference data in a data bank. By limiting the system to the examination of the vehicle underbody, costs may be held low in comparison to a system which examines the entire vehicle.

According to one further advantageous refinement of the present invention, it is provided that the method be carried out in areas in which the motor vehicle is traveling only at walking speed. This advantageously permits, in a simple way, carrying out an automated inspection of the vehicle underbody in the case of a rolling motor vehicle without making an intermediate stop.

According to a further advantageous refinement of the present invention, it is provided that one use one camera as the camera device.

According to a further advantageous refinement of the present invention, it is provided that one use a plurality of cameras as the camera device.

According to a still further advantageous refinement of the present invention, it is provided that one use a plurality of cameras aligned in the opposite direction as the camera device. Thereby a sufficiently high resolution of the two-dimensional overall picture and the three-dimensional depth information are achieved for testing the vehicle underbody.

According to another advantageous refinement of the present invention, it is provided that the method be applied at the entrance to a gas station and/or to a motor vehicle repair shop and/or to a motor vehicle dealer.

According to yet another advantageous refinement of the present invention, it is provided that the system additionally have a display device which is designed to display a test result of the testing of the vehicle underbody of the motor vehicle. This permits a simple checking of the vehicle underbody on a monitor.

According to yet another advantageous refinement of the present invention, it is provided that the system additionally have an illumination device which is designed to illuminate the vehicle underbody of the motor vehicle.

The above embodiments and developments may be combined as desired if such a combination appears useful.

Additional possible embodiments, further refinements and implementations of the present invention also include combinations of features of the present invention not explicitly mentioned above or below with regard to the exemplary embodiments. In particular, one skilled in the art will also add individual aspects as improvements or supplementations to the respective basic form of the present invention.

Additional features and advantages of specific embodiments of the present invention result from the following description with reference to the appended drawing.

DETAILED DESCRIPTION OF THE INVENTION

Figure 1:
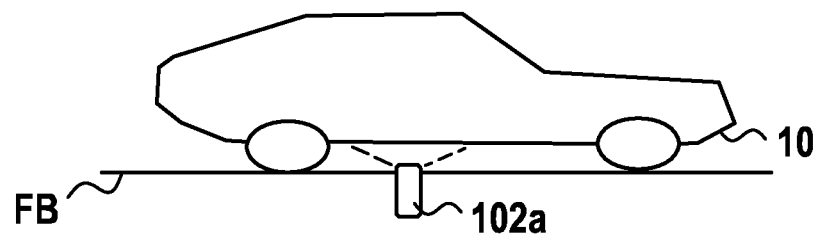
FIG. 1 shows a schematic representation of a system for testing a vehicle underbody of a motor vehicle according to a specific embodiment of the present invention.

Unless stated otherwise, identical or functionally equivalent elements, features and components have been provided with the same reference symbols in the figures of the drawings. It is furthermore understood that components and elements in the drawings are not necessarily depicted true to scale with respect to one another, for reasons of clarity and comprehensibility.

Specific Embodiments of the Invention

FIG. 1 shows a schematic representation of a system for testing a vehicle underbody of a motor vehicle according to a specific embodiment of the present invention.

The method for testing a vehicle underbody U of a motor vehicle 10 uses a camera device 102a. Camera device 102a includes an area sensor, for example, in the form of a CCD sensor or another light-sensitive electronic component. In this context, CCD stands for charge-coupled device.

Camera device 102a may be equipped to have an objective lens and forms a unit for image measurement. The image measurement unit is located in a depression within the roadway FB or within a crossable threshold on roadway FB. If motor vehicle 10 crosses the image measurement unit, images of vehicle underbody U of motor vehicle 10 are recorded.

Figure 2:
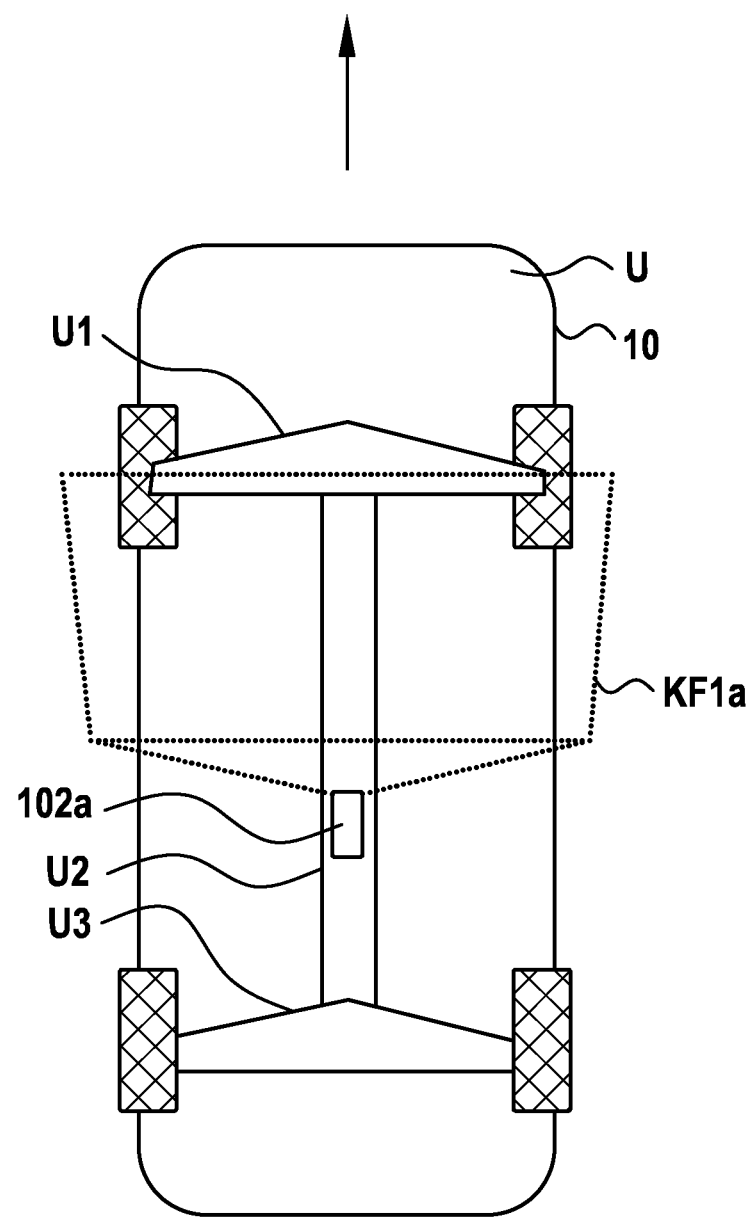
FIGS. 2-9 show a schematic representation of a top view on a camera field of view onto a vehicle underbody using a system for testing a vehicle underbody of a motor vehicle according to a specific embodiment of the present invention.

FIG. 2 shows a schematic illustration of a top view of a vehicle underbody according to a specific embodiment of the present invention.

An image KF1a is taken by a camera device 102a. The resolution of image KF1a is a function of at which image scale an objective detail is imaged on the area sensor of the image measurement unit. The image scale is a function of the focal length and the taking separation between the image measurement unit and the underbody. The focal length and the imaging properties of the objective lens, such as the depth of field, are selected so that vehicle underbody U of motor vehicle 10 of a category, such as a passenger car, is imaged having a sufficient quality so that subunits U1, U2, U3 of vehicle underbody U are able to be tested.

For this purpose, an estimation is sufficient that the underbody of all passenger cars is located at a distance of approximately 100 mm to 500 mm above the roadway. The design of the image measurement unit for the least favorable case, i.e. for vehicles having the largest ground clearance, ensures sufficient resolution of the images for testing the images for possible damaged areas.

For other vehicle categories, such as commercial vehicles, trucks, buses, image measurement units having the appropriate optical properties may be used, if necessary.

The quality of the images is a function of the travel speed of the vehicle and the exposure time of the images. Based on the premise selected, for example, that the vehicle should move over the camera at a walking speed of less than 15 km/h, the exposure time may be selected so that the motional blurring in the images caused by the moving vehicle is so small as to be negligible. If the driving speed is too great, the motional blurring resulting from this leads to a deterioration of the contrast, and may thus be drawn upon for detecting invalid measurements in response to the exceeding of the specified speed.

The exposure time is decisively a function of the available light. An illumination unit, coordinated with the properties of the image measurement sensor and an optimal design in the visible and/or the invisible spectral range, may be used to supplement the naturally present environmental light. This is required above all in a system having 24-hour application.

Figure 3:
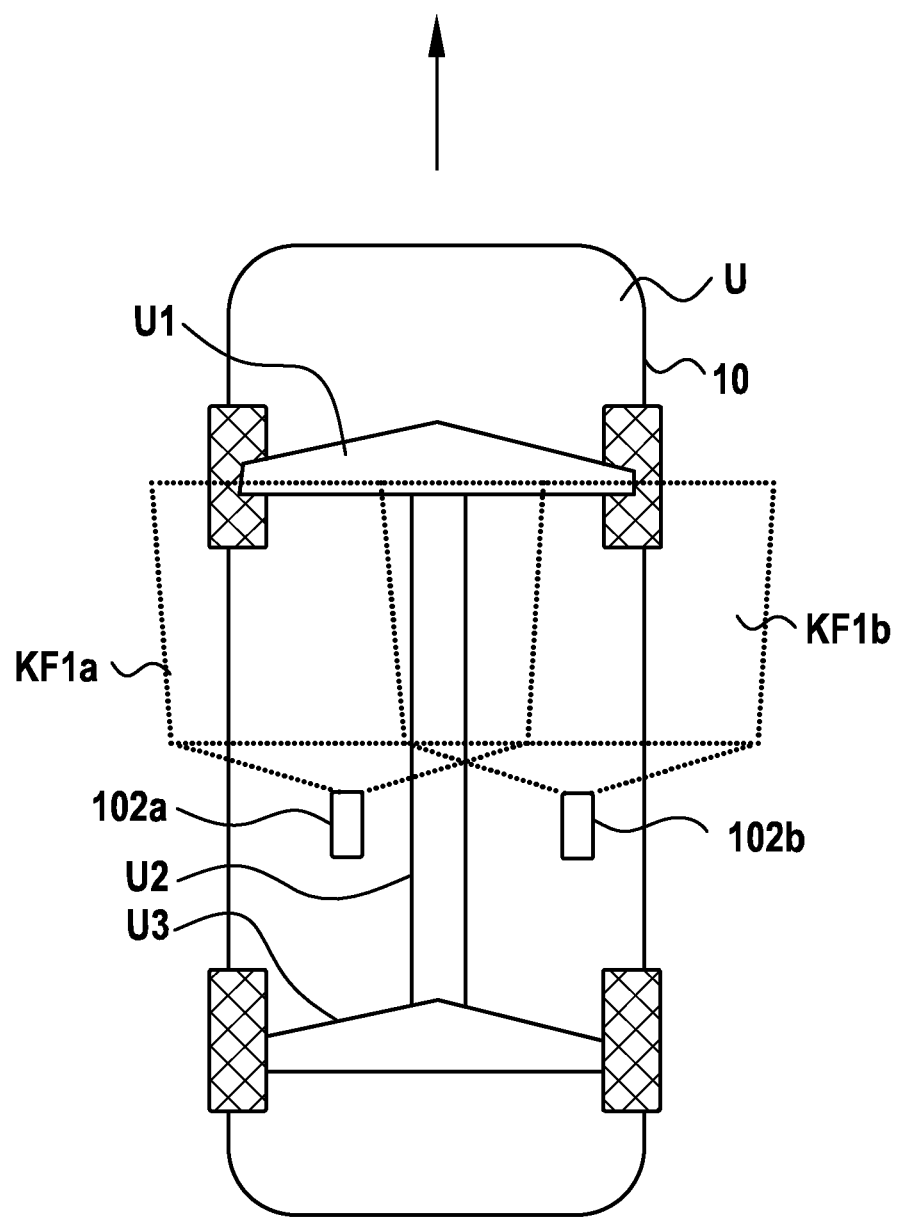

FIG. 3 shows a schematic illustration of a top view onto a vehicle underbody according to a specific embodiment of the present invention.

In the system shown in FIG. 3, two camera devices $102a$, $102b$, aligned in the same direction, are used. The two camera devices $102a$, $102b$ record two images KF$1a$, KF$1b$ of at least one area of vehicle underbody U of motor vehicle 10.

FIG. 3 shows, for example, an arrangement of two camera devices $102a$, $102b$, which are situated side by side. Increasing the number of camera devices transverse to the travel direction reduces the covering transverse to the travel direction and permits a view into the wheel housings of the vehicle. The lateral overlap amounts to about 5% to 10%, for example, and thus enables gap-free imaging of vehicle underbody U, by joining partial images to form one overall image.

The other reference symbols represented in FIG. 3 were already described in the associated description of FIG. 2 and are thus not explained further.

Figure 4:
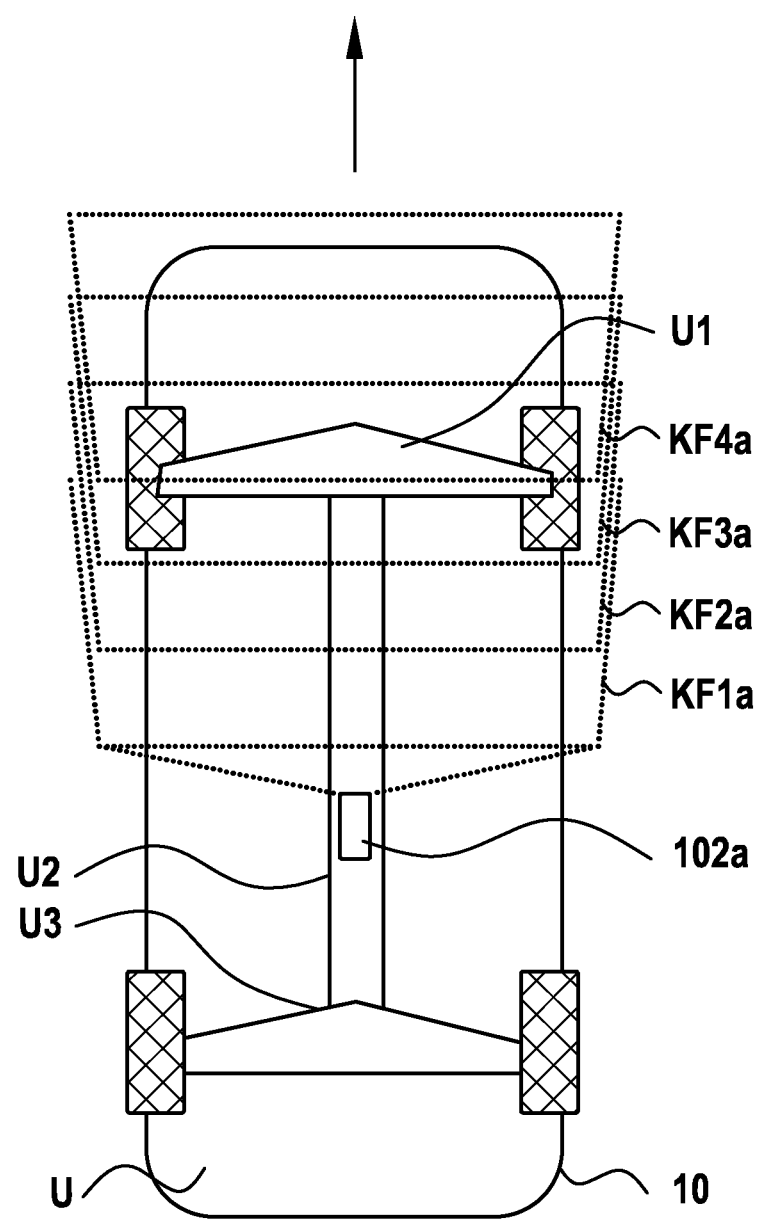

FIG. 4 shows a schematic illustration of a top view onto a vehicle underbody according to a specific embodiment of the present invention.

In the system shown in FIG. 4, a camera device $102a$ is used. Camera device $102a$ records a sequence of images KF$1a$ . . . KF$5a$ of vehicle underbody U of motor vehicle 10.

In this connection, camera device $102a$ is crossed by vehicle 10 in the direction shown by the arrow.

Furthermore, the traveling speed of motor vehicle 10 may also be ascertained approximately by the known taking frequency and the distance defined approximately of camera device $102a$ from the underbody. For this purpose, an object feature is looked for in at least two images, and the path covered in the image is put into relationship with the image taking frequency and the distance between camera device $102a$ and vehicle underbody U. It is advantageous to use a plurality of object features and to form an average of the individual speeds. The driving speed ascertained from the object features may also be drawn upon for detecting invalid measurements in response to exceeding the specified speed.

The image taking frequency is selected in such a way that the underbody is recorded without gaps, and the images of the one camera device $102a$ overlap by at least 50%. In FIG. 4, camera device $102a$ sequentially records the vehicle underbody U of the motor vehicle in the successive images KF$1a$ . . . KF$5a$ while the vehicle is moving all the way over camera device $102a$. This enables the providing of a three-dimensional depth information using only one camera device $102a$.

In this context, correspondences in images KF$1a$ . . . KF$5a$ are ascertained and followed from image to image. The motional vectors of the correspondences as a function of time permit the reconstruction of the three-dimensional object with the simultaneous determination of spatial relative orientations between the taking positions a camera device $102a$ that has moved virtually with respect to s static object. However, the scale of the three-dimensional depth information is indeterminate.

The other reference symbols represented in FIG. 4 were already described in the associated description of FIGS. 2 and 3, and are thus not explained further.

Figure 5:
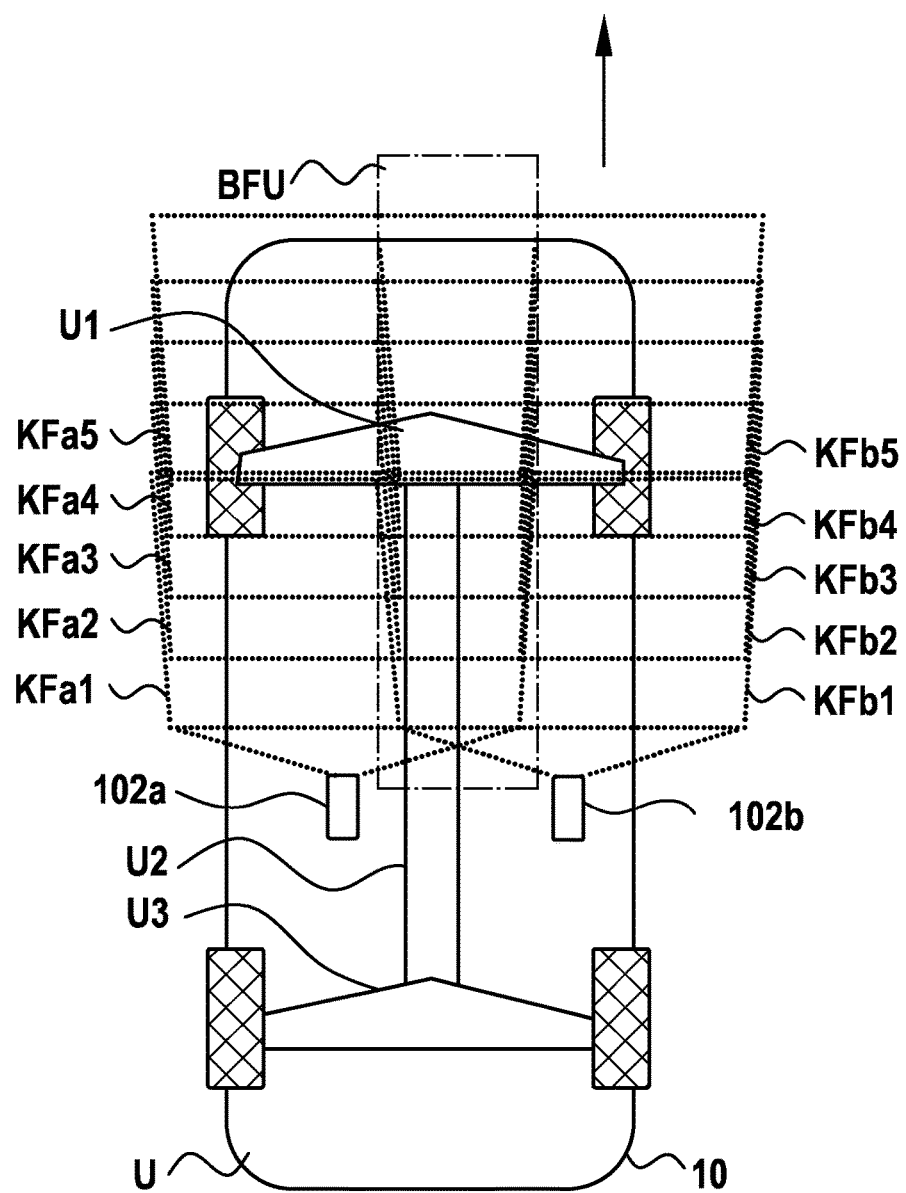

FIG. 5 shows a schematic illustration of a top view onto a vehicle underbody according to a specific embodiment of the present invention.

In the system shown in FIG. 5, two camera devices $102a$, $102b$, aligned in the same direction, are used. Camera devices $102a$, $102b$ record two sequences of images KF$1a$ . . . KF$5a$, KF$1b$ . . . KF$5b$ of vehicle underbody U of motor vehicle 10.

In this connection, the two camera devices $102a$ are crossed by motor vehicle 10 in the direction shown by the arrow.

FIG. 5 shows how the three-dimensional information of the entire vehicle underbody U is able to be generated in this arrangement, too, by the method "structure from motion", "Struktur durch Bewegung" in German, for camera devices $102a$, $102b$, in that an image overlapping BFU takes place in the form of the overlapping of the two sequences of images KF$1a$ . . . KF$5a$, KF$1b$ . . . KF$5b$ in the travel direction of motor vehicle 10. The image taking of the two camera devices $102a$, $102b$ does not have to take place synchronously.

The other reference symbols represented in FIG. 5 were already described in the associated description of FIGS. 2, 3 and 4, and are thus not explained further.

Figure 6:
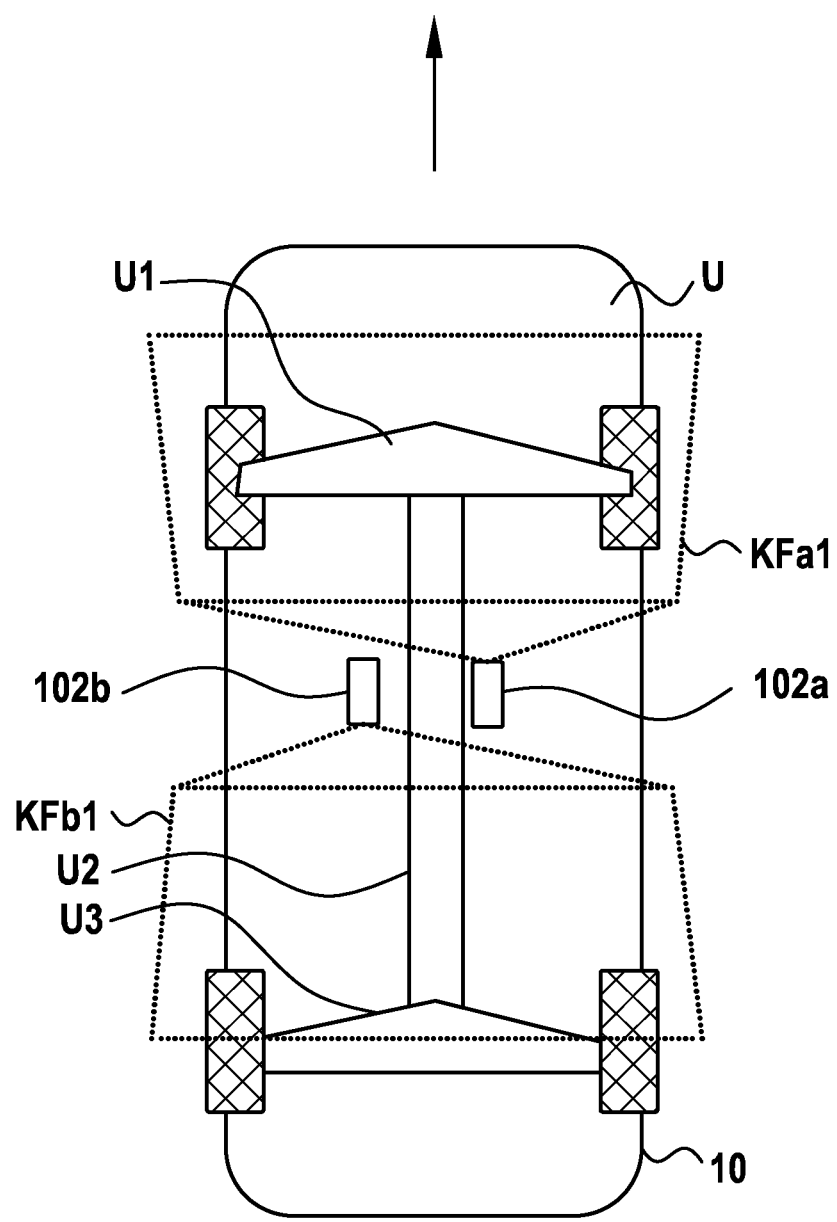

FIG. 6 shows a schematic illustration of a top view onto a vehicle underbody according to a specific embodiment of the present invention.

In the system shown in FIG. 6, two camera devices $102a$, $102b$, aligned in the opposite direction, are used. The two camera devices $102a$, $102b$ record two images KF$1a$, KF$1b$ of at least one area of vehicle underbody U of motor vehicle 10.

The other reference symbols represented in FIG. 6 were already described in the associated description of FIG. 2 and are thus not explained further.

Figure 7:
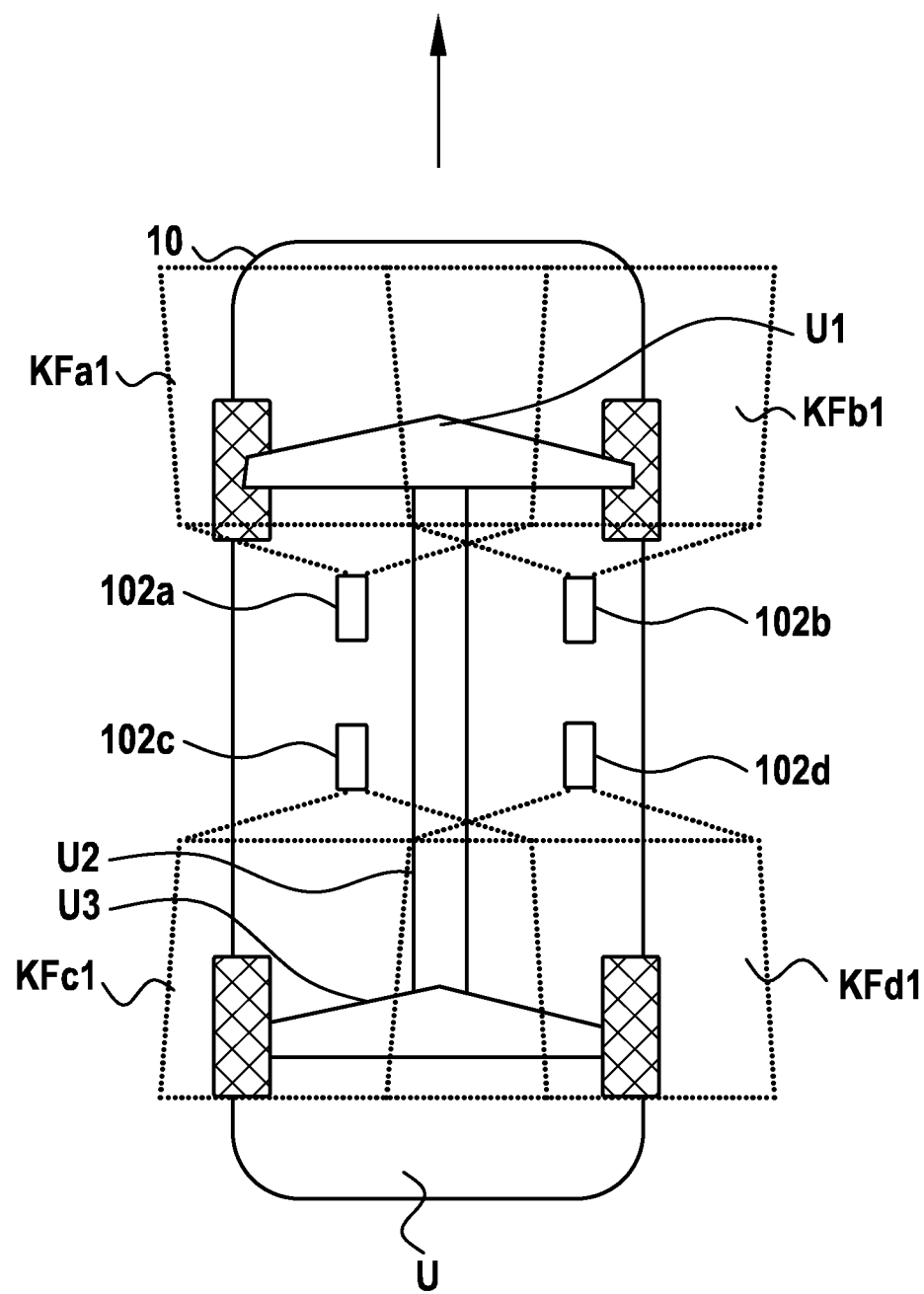

FIG. 7 shows a schematic illustration of a top view onto a vehicle underbody according to a specific embodiment of the present invention.

In the system shown in FIG. 7, four camera devices $102a$, $102b$, $102c$, $102d$ are used, in each case two camera devices being aligned in the same direction. The four camera devices $102a$, $102b$ record four images KF$1a$, KF$1b$, KF$1c$, KF$1d$ of vehicle underbody U of motor vehicle 10.

The other reference symbols represented in FIG. 7 were already described in the associated description of FIG. 2 and are thus not explained further.

Figure 8:
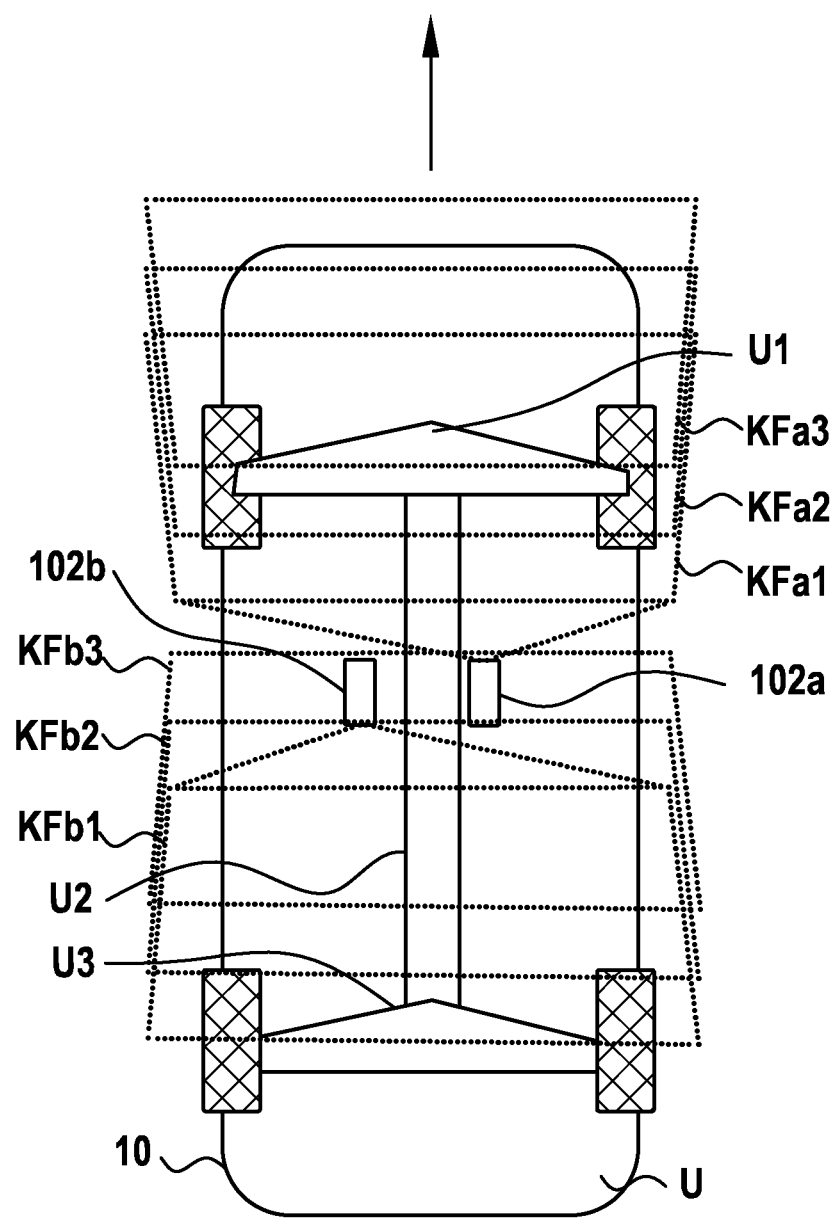

FIG. 8 shows a schematic illustration of a top view onto a vehicle underbody according to a specific embodiment of the present invention.

In the system shown in FIG. 8, two camera devices $102a$, $102b$, aligned in the opposite direction, are used. The two camera devices 102a, 102b record two sequences of images KF1a . . . KF5a, KF1b . . . KF5b of vehicle underbody U of motor vehicle 10.

In this connection, the two camera devices 102a, 102b are crossed by motor vehicle 10 in the direction shown by the arrow.

The two camera devices 102a, 102b have no mutual overlap, camera devices 102a facing in the travel direction, second camera devices 102b facing opposite to the travel direction. A reconstruction according to the principle "structure from motion", "Struktur durch Bewegung" in German, in turn, may take place separately for each camera device. However, the taking configuration offers the possibility of minimizing the covering in the travel direction.

The other reference symbols represented in FIG. 8 were already described in the associated description of FIGS. 2, 3 and 4, and are thus not explained further.

Figure 9:
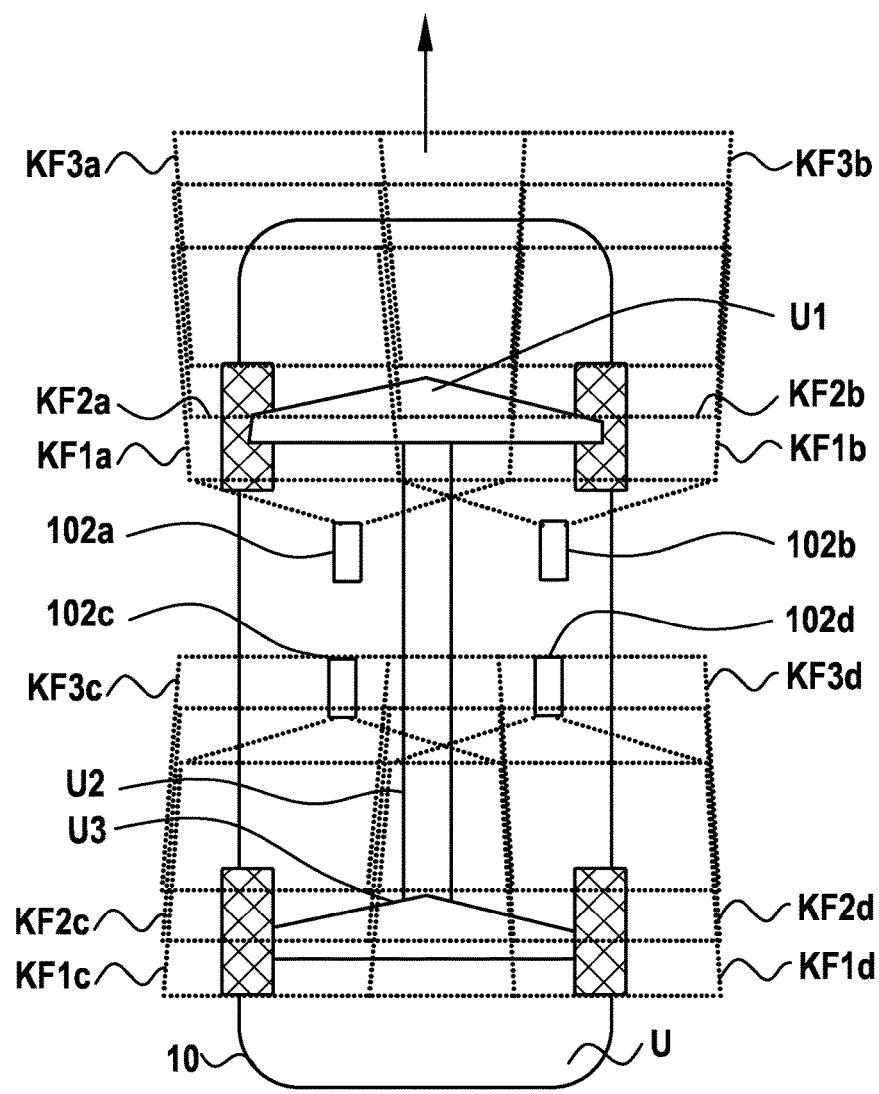

FIG. 9 shows a schematic illustration of a top view onto a vehicle underbody according to a specific embodiment of the present invention.

FIG. 9 shows an additional embodiment in the form of a combination of camera devices situated side by side and aligned in the opposite direction, to clarify the minimization of blind spaces that are at the same time transverse to the travel direction and in the travel direction.

In the system shown in FIG. 9, four camera devices 102a, 102b, 102c, 102d are used, in each case two camera devices being aligned in the same direction. The four camera devices 102a, 102b, 102c, 102d record four sequences of images KF1a, KF1b, KF1c, KF1d of vehicle underbody U of motor vehicle 10.

Figure 10:
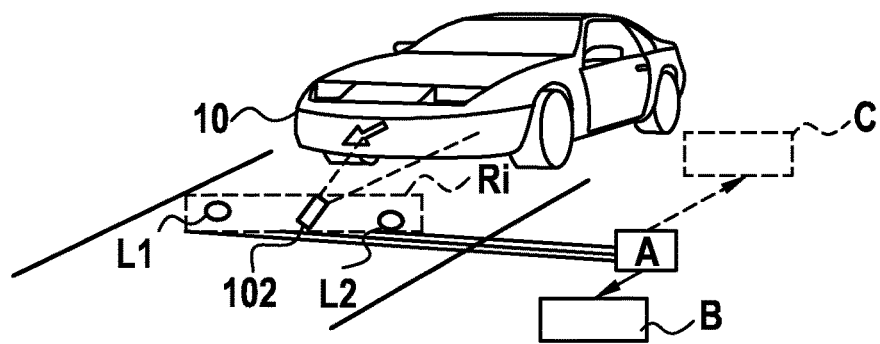
FIG. 10 shows a schematic representation of a system for testing a vehicle underbody of a motor vehicle according to a specific embodiment of the present invention.

FIG. 10 shows a specific embodiment of the system for testing the vehicle underbody using a camera device 102a and two illumination devices L1 and L2 in or on a roadway FB that is transverse to the travel direction of motor vehicle 10.

Camera device 102a and illumination devices L1 and L2 are connected to an evaluation device A. Evaluation device A is connected to a display device B. Furthermore, evaluation device A may also be connected to a server device C.

Evaluation device A is designed for controlling the image measurement unit, the illumination unit and the storing of the images during each crossing.

The test system may expediently be integrated into a crossing groove Ri, of the kind known and proven from road construction.

Figure 11:
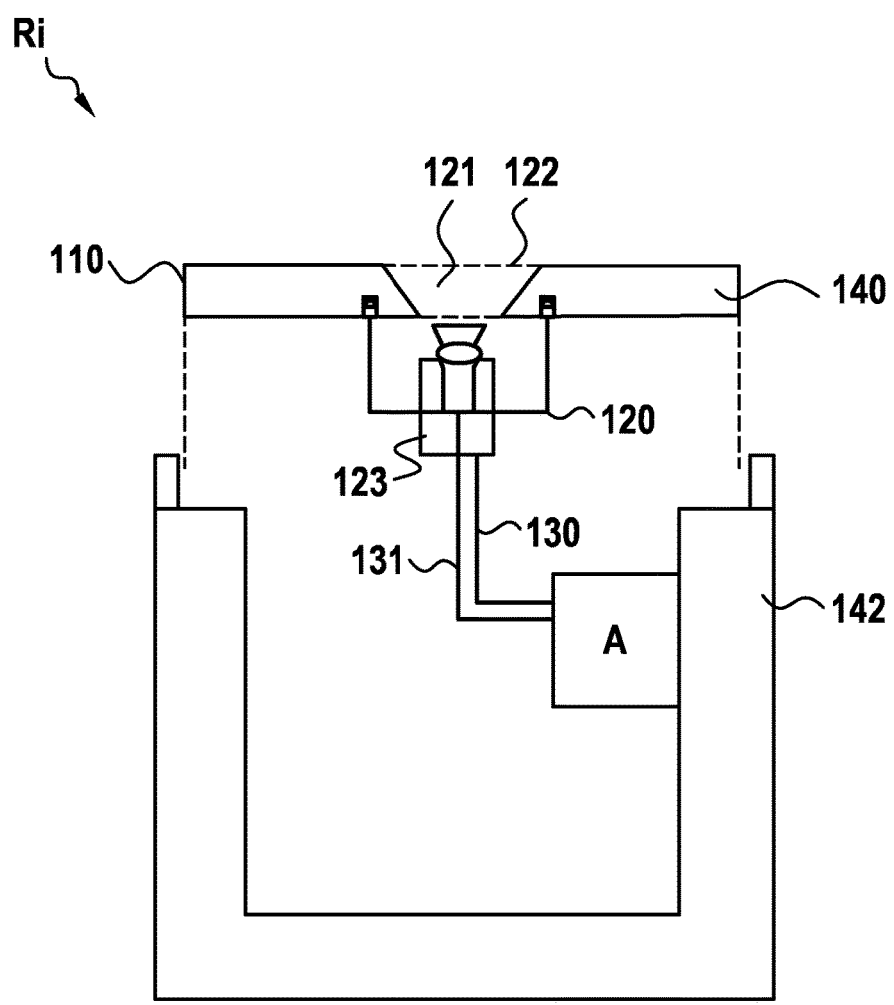
FIG. 11 shows a schematic representation of a system for testing a vehicle underbody of a motor vehicle according to a specific embodiment of the present invention.

FIG. 11 shows a schematic representation of a system for testing a vehicle underbody of a motor vehicle in cross section, according to a specific embodiment of the present invention.

A cover 122 of crossing groove Ri has a recess 121, through which camera device 102 records vehicle underbody U and illumination device L illuminates the underbody. Camera device 102 and the illumination are fastened on the lower side of cover 122, using a mounting brace 120, for instance.

Camera device 102 and the illumination are connected via two cable connections 130, 131 to evaluation device A. Evaluation device A is situated on a foundation support 142. Crossing groove Ri also has two end regions 110 and 140.

Evaluation device A may also be integrated into crossing groove Ri. Mounting it on the side wall of crossing groove Ri protects evaluation device A from backwater.

Figure 12:
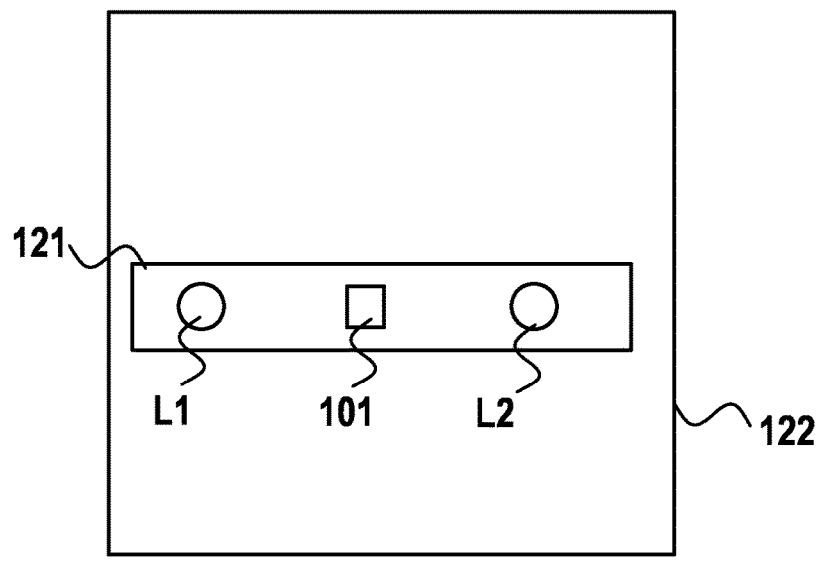
FIG. 12 shows a schematic representation of a crossing groove according to a specific embodiment of the present invention.

FIG. 12 shows a schematic illustration of a crossing groove according to a specific embodiment of the present invention.

A crossing groove Ri includes a cover 122 and a recess 121. In recess 121, a camera device 102 and two illumination devices L1 and L2 are developed.

Figure 13:
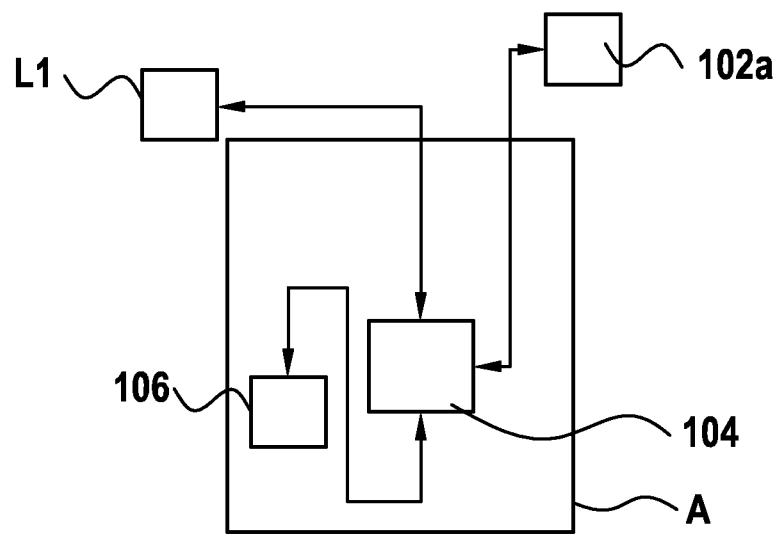
FIG. 13 shows a schematic representation of a system for testing a vehicle underbody of a motor vehicle according to a specific embodiment of the present invention.

FIG. 13 shows an evaluation device A according to a specific development of the present invention.

Evaluation device A includes an arithmetic unit 104 and a memory unity 106, and is connected to a camera device 102a and an illumination device L1.

Evaluation device A carries out the analysis of the image data, the testing for the exceeding of the optimal driving speed, as well as, finally, the providing of the two-dimensional overall image and the three-dimensional depth information, and controls display device B for displaying three-dimensional depth information obtained, and optionally transmits the three-dimensional depth information to a superordinated server C.

To test for damaged areas, the use of the absolute scale for the two-dimensional image and the three-dimensional depth image are of subordinate importance. Therefore, as a rule, the use of an approximate object scale is sufficient and is known sufficiently by the approximated information of the taking distance between the camera device and the vehicle underbody U.

One possibility for determining an improved scale is the use of a known variable at the object. If a component is identified in the underbody image of vehicle underbody U, and if the true size of the component is known to the system, the scale of the respective image of the vehicle underbody U may be correspondingly adjusted. The introduction of known components is possible if the vehicle has been identified and corresponding data are stored in a data bank of server C.

An improvement of the scale is also possible, however, if components are identified which have a certain correspondence over a multiplicity of vehicles from different manufacturers and models, such as screw heads, the diameter of brake lines or the diameter of the tail pipe.

The use of more than one camera device is advantageous while maintaining the measuring principles described. Thereby, the quality of the representation of the underbody is able to be increased by, on the one hand, enlarging the image scale and, on the other hand, spaces of impaired viewing may be decreased by the mutual covering of components. The generation of the three-dimensional depth information takes place analogously, as described above.

The three-dimensional reconstructions of the individual cameras, that are independent, for the moment, having their respectively independently determined scales, are transformed via object features in the transverse overlap regions into a common coordinate system. A scale adaptation of the results is used for the adjustment of the two regions recorded. Thus, the system of the first camera is able to be transformed into the system of the second camera, or vice versa, If more than one camera device is used, their mutual orientation may be known. If the orientation is known, the transversely overlapping area may be drawn upon for determining the object scale.

The three-dimensional reconstructions of the individual cameras, that are independent, for the moment, having their respectively independently determined scales mi, are transformed via object features in the transverse overlap regions into a common coordinate system.

In the case of the transformation, the distance, derived from the known mutual orientations, between the camera devices, specifies the absolute scale for the imaging and the three-dimensional depth image. The assumption for taking into account the absolute scale from mutually known orientations is synchronous image recording.

A further possibility for producing a three-dimensional depth image using only one camera device is fulfilled if a beam splitter, known per se, in front of the objective lens of the camera device, images two half images on one image sensor. Beam splitters having mirrors or prisms are used in hobby-style photography and the film industry, and offer a simple possibility for generating stereoscopic vision.

The advantage of this use of a camera device having a beam splitter is the possibility of a direct production of synchronized images at constructively known mutual orientation of the two virtual cameras.

Figure 14:
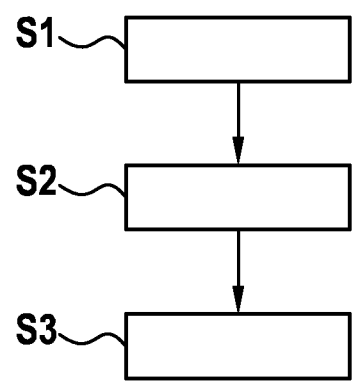
FIG. 14 shows a graphic representation of a method according to another specific embodiment of the present invention.

FIG. 14 shows a graphic representation of a flow chart of a method for testing a vehicle underbody of a motor vehicle according to a further specific embodiment of the present invention.

As a first step of the method, a recording S1 takes place of at least one image Kfa1, KFb1, KFc1, KFd1 of at least one area of vehicle underbody U of motor vehicle 10, using a camera device 102a, 102b, 102c, 102d.

The second step of the method is producing S2 a three-dimensional depth image with the aid of the at least one recorded image KFa1, KFb1, KFc1, KFd1 of the at least one area of vehicle underbody U of motor vehicle 10.

The third step of the method is testing S3 of the at least one area of vehicle underbody U of a motor vehicle 10, with the aid of the produced three-dimensional depth image of the vehicle underbody U using optical image recognition.

The method for testing a vehicle underbody of a motor vehicle may be applied at the entrance to a gas station and/or to a motor vehicle repair shop and/or to a parking lot and/or to a motor vehicle dealer. The motor vehicle dealer may be a used car dealer.

Although the present invention was described above with reference to preferred exemplary embodiments, it is not limited to these, but may be modified in numerous ways. In particular, one is able to change or modify the invention in many ways without deviating from the crux of the present invention.

What is claimed is:

1. A method for testing a vehicle underbody of a motor vehicle, comprising:
    recording, by each camera of a camera system having at least one camera, a respective sequence of successive overlapping images of at least one area of the vehicle underbody of the motor vehicle, using a camera system, while the motor vehicle moves over the at least one camera;
    producing, using a structure from motion method, a three-dimensional depth image using each respective sequence of successive overlapping images of the at least one area of the vehicle underbody of the motor vehicle; and
    testing the at least one area of the vehicle underbody of the motor vehicle with the aid of the produced three-dimensional depth image of the vehicle underbody using optical image recognition.

2. The method as recited in claim 1, wherein the method is carried out in response to a motor vehicle rolling all the way over the camera system.

3. The method as recited in claim 2, wherein the method is carried out in areas in which the motor vehicle is traveling only at a speed of less than 15 km/h.

4. The method as recited in claim 2, wherein only a single camera is used as the camera system.

5. The method as recited in claim 2, wherein the camera system includes multiple cameras.

6. The method as recited in claim 2, wherein the camera system includes at least two cameras aligned in the opposite direction and having no mutual overlap in their field of view.

7. The method as recited in claim 2, wherein the method is implemented at least one of at the entrance to a gas station, at an entrance to a motor vehicle repair shop, at an entrance to a parking lot, and at an entrance to a motor vehicle dealer.

8. A system for testing a vehicle underbody of a motor vehicle, comprising:
    a camera device including at least one camera, the camera device configured in a way that each at least one camera records a respective sequence of successive overlapping images of at least one area of the vehicle underbody of the motor vehicle; and
    an evaluation device configured to produce a three-dimensional depth image, using a structure from motion method, and using each respective sequence of successive overlapping images of the at least one area of the vehicle underbody of the motor vehicle and to test the at least one area of the vehicle underbody of the motor vehicle with the aid of the produced three-dimensional depth image of the vehicle underbody using optical image recognition.

9. The system as recited in claim 8, further comprising:
    a display device configured to display a test result of the testing of the vehicle underbody of the motor vehicle.

10. The system as recited in claim 8, further comprising:
    an illumination device configured to illuminate the vehicle underbody of the motor vehicle.

11. The method as recited in claim 1, wherein the method is performed without use of any laser line transmitter.

12. The method as recited in claim 1, further comprising:
    ascertaining correspondences between images within each respective sequence of successive overlapping images; and
    determining motion vectors of the correspondences as a function of time;
    wherein the producing of the three-dimensional depth image includes using the motion vectors.

13. The method as recited in claim 1, wherein each respective sequence of successive overlapping images includes images that overlap by at least 50%.

14. The method as recited in claim 1, wherein the three-dimensional depth image is produced using the respective sequence of successive overlapping images from only one camera of the camera system.

15. The method as recited in claim 1, wherein the camera includes two cameras aligned in the opposite direction from one another, and wherein the producing of the three-dimensional image including a reconstruction according to the structure from motion method, the reconstruction being performed separately for each of the two cameras.

16. The system as recited in claim 8, wherein the evaluation unit ascertains correspondences between images within each respective sequence of successive overlapping images, determines motion vectors of the correspondences as a function of time, and produces the three-dimensional depth image using the motion vectors.

17. The system as recited in claim 8, wherein each respective sequence of successive overlapping images includes images that overlap by at least 50%.

18. The system as recited in claim 8, wherein the evaluation device produces the three-dimensional depth image using the respective sequence of successive overlapping images from only one camera of the camera system.

19. The system as recited in claim 8, wherein the camera device includes two cameras aligned in the opposite direction from one another, and wherein the evaluation device produces of the three-dimensional image by reconstruction according to the structure from motion method, the reconstruction being performed separately for each of the two cameras.

* * * * *